(12) United States Patent
Munz (10) Patent No.: US 7,438,550 B2
(45) Date of Patent: *Oct. 21, 2008

(54) PLANT FOR THE PREPARATION OF MATERIALS

(75) Inventor: Rainer Munz, Murrhardt (DE)

(73) Assignee: Coperion Werner & Pfleiderer GmbH & Co. KG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/558,175

(22) PCT Filed: Apr. 17, 2004

(86) PCT No.: PCT/EP2004/004112

§ 371 (c)(1),
(2), (4) Date: Nov. 22, 2005

(87) PCT Pub. No.: WO2004/106032

PCT Pub. Date: Dec. 9, 2004

(65) Prior Publication Data

US 2006/0233903 A1    Oct. 19, 2006

(30) Foreign Application Priority Data

May 28, 2003   (EP)   .................... 03011996

(51) Int. Cl.
*B29C 47/50*   (2006.01)
*B29C 47/68*   (2006.01)

(52) U.S. Cl. .................... 425/192 R; 210/236; 210/359; 210/447; 210/450; 425/186; 425/197; 425/205

(58) Field of Classification Search ................. 425/197, 425/198, 199, 205, 186, 192 R; 210/236, 210/359, 447, 450
See application file for complete search history.

(56) References Cited

U.S. PATENT DOCUMENTS

| | | | | |
|---|---|---|---|---|
| 2,838,084 A | * | 6/1958 | Samler | .................... 137/15.08 |
| 3,007,199 A | * | 11/1961 | Curtis | ........................ 425/185 |
| 3,145,746 A | * | 8/1964 | Scher | ........................ 210/447 |
| 3,261,056 A | | 7/1966 | Fritsch | |
| 3,743,101 A | | 7/1973 | Schmidt | |
| 3,860,220 A | * | 1/1975 | Matsubayashi et al. | ........ 366/86 |
| 3,876,545 A | * | 4/1975 | Norwood | .................... 210/236 |
| 4,410,477 A | | 10/1983 | Claude | |
| 4,615,664 A | * | 10/1986 | Kolossow | .................... 425/4 C |
| 4,728,279 A | * | 3/1988 | Bellmer | ...................... 425/185 |
| 4,931,185 A | * | 6/1990 | Bourgeois et al. | ........... 210/636 |
| 5,605,626 A | * | 2/1997 | Gneuss | ........................ 210/236 |
| 6,010,625 A | * | 1/2000 | Whitman | .................... 210/236 |

(Continued)

FOREIGN PATENT DOCUMENTS

DE    2 304 088    8/1973

(Continued)

*Primary Examiner*—Robert B. Davis
*Assistant Examiner*—Joseph Leyson
(74) *Attorney, Agent, or Firm*—McGlew & Tuttle, P.C.

(57) ABSTRACT

A material processing plant comprises a first screw-type extruding machine and a second screw-type extruding machine downstream thereof. The screw-type extruding machines are connected to one another by means of a function casing which is embodied for displacement substantially to the side of a direction of flow out of a position of operation in a push-out direction.

13 Claims, 9 Drawing Sheets

U.S. PATENT DOCUMENTS

6,260,852 B1 * 7/2001 Reineke .................. 277/609
6,375,450 B1 * 4/2002 Golomb et al. ............ 425/199

FOREIGN PATENT DOCUMENTS

| EP | 1 005 411 B1 | 6/2000 |
| GB | 1 364 725 | 8/1974 |
| WO | WO 99/20454 | 4/1999 |
| WO | WO 02/057065 A1 | 7/2002 |

\* cited by examiner

PLANT FOR THE PREPARATION OF MATERIALS

CROSS REFERENCE TO RELATED APPLICATIONS

This application is a United States National Phase application of International Application PCT/EP2004/004112 and claims the benefit of priority under 35 U.S.C. § 119 of European Application Number 03 011 996.0 filed May 28, 2003, the entire contents of which are incorporated herein by reference.

FIELD OF THE INVENTION

The present invention pertains to a material processing plant comprising a first screw-type extruding machine; a second screw-type extruding machine downstream of the first screw-type extruding machine; and a delivery zone which connects the first screw-type extruding machine to the second screw-type extruding machine.

BACKGROUND OF THE INVENTION

In particular in the processing of plastics, it is often reasonable to provide two or several successive extruders, each of which performing individual processing steps. For example, when plastic material is used in the form of powder, inlet and melting of the powder can take place in a first extruder. Homogenizing and pressure build-up then takes place in a second, downstream extruder. Successive extruder arrangements of the generic type are known for example from EP 1 005 411 B1, U.S. Pat. No. 3,261,056 and DE 2 304 088 A. The known plants are distinguished by the fact that additional process steps that must be performed between the two extruders are hard to integrate. The term 'materials' is to be understood as fundamentally free flowing materials that are treatable in screw-type extruding machines.

SUMMARY OF THE INVENTION

It is an object of the invention to develop a plant of the generic type for improved versatility in the vicinity of the delivery zone.

According to the invention, this object is attained by a function casing being disposed in the delivery zone, having a second overflow passage of a diameter $D_2$ which runs in a direction of flow, the function casing being designed for displacement substantially to the side of the direction of flow out of a position of operation in the delivery zone in a push-out direction; and the second overflow passage of the function casing being connected to the first screw-type extruding machine by means of a first overflow passage of a diameter $D_1$, and the second screw-type extruding machine by means of a third overflow passage of a diameter $D_3$. As a result of the design according to the invention, a function casing, which comprises at least one function element which is disposed in the overflow passage, can very easily be inserted in, and removed from, the delivery zone. Cleaning is rendered possible or also replacement of function elements when at least one of a sieve and a supporting plate and a static mixer and a filter and a strainer plate are provided in the function casing. With no function elements provided, the function casing can be made shorter, whereas it is correspondingly longer when function elements exist. Even if no function elements are provided, it will as a rule make sense to provide the function casing because, after it has been pushed out, the adjacent areas of the delivery zone lie open so that they can for example be cleaned upon a change of color.

The development wherein $D_1 \leq D_2 \leq D_3$ applies to the relationship of the diameter $D_2$ and $D_3$ ensures that there are no corners or edges in the flow direction which project into the overflow passages. For, depending on the condition of heating, the function casing, upon insertion into the delivery zone, will exhibit some minor lateral misalignment from the first and third overflow passage.

The embodiment wherein the function casing is designed to expand in the shape of a wedge in the push-out direction is of special advantage, ensuring, among other things, that the function casing, regardless of its temperature, can be moved into, and fixed in, the delivery zone. Further advantageous developments are attained by a plant wherein the function casing comprises a first contact surface turned towards a contact surface that is allocated to the first overflow passage and a second contact surface turned towards a contact surface that is allocated to the third overflow passage; and wherein at least one of the first contact surface and the second contact surface extend one towards the other in the shape of a wedge.

As a result of the embodiments wherein packings are disposed in the second contact surface of the function casing, wherein the push-out direction runs such that the contact surface which is turned towards the packings is lifted off the packings during the push-out motion and wherein only the contact surfaces that are turned towards the first overflow passage are connectable to each other by screwing in the position of operation, the function casing must as a rule be fixed by screwing only towards the first screw-type extruding machine, while sealing towards the second screw-type extruding machine only by thermal expansion. Owing to the thermal elongation of the function casing by heating during operation, the contact surfaces that are turned towards the second screw-type extruding machine are tightly pressed against each other. With only inferior pressure of the materials to be processed prevailing very often in this area, this is sufficient.

When the function casing is displaceable on rails and when a slide drive acts on the function casing the handling of the function casing is improved when pushed out or inserted.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, The first exemplary embodiment seen in FIGS. 1 to 5 comprises a first extruder 1 and a second extruder 2. The first extruder 1 is disposed above the second extruder 2. The first extruder 1 is actuated by a first motor 3 via a first coupling 4 and a first transmission 5. The second extruder 2 is driven by a second motor 6 via a second coupling 7 and a second transmission 8. Control of the motors 3 and 6 takes place by way of a control unit 9.

Figures 1, 3:
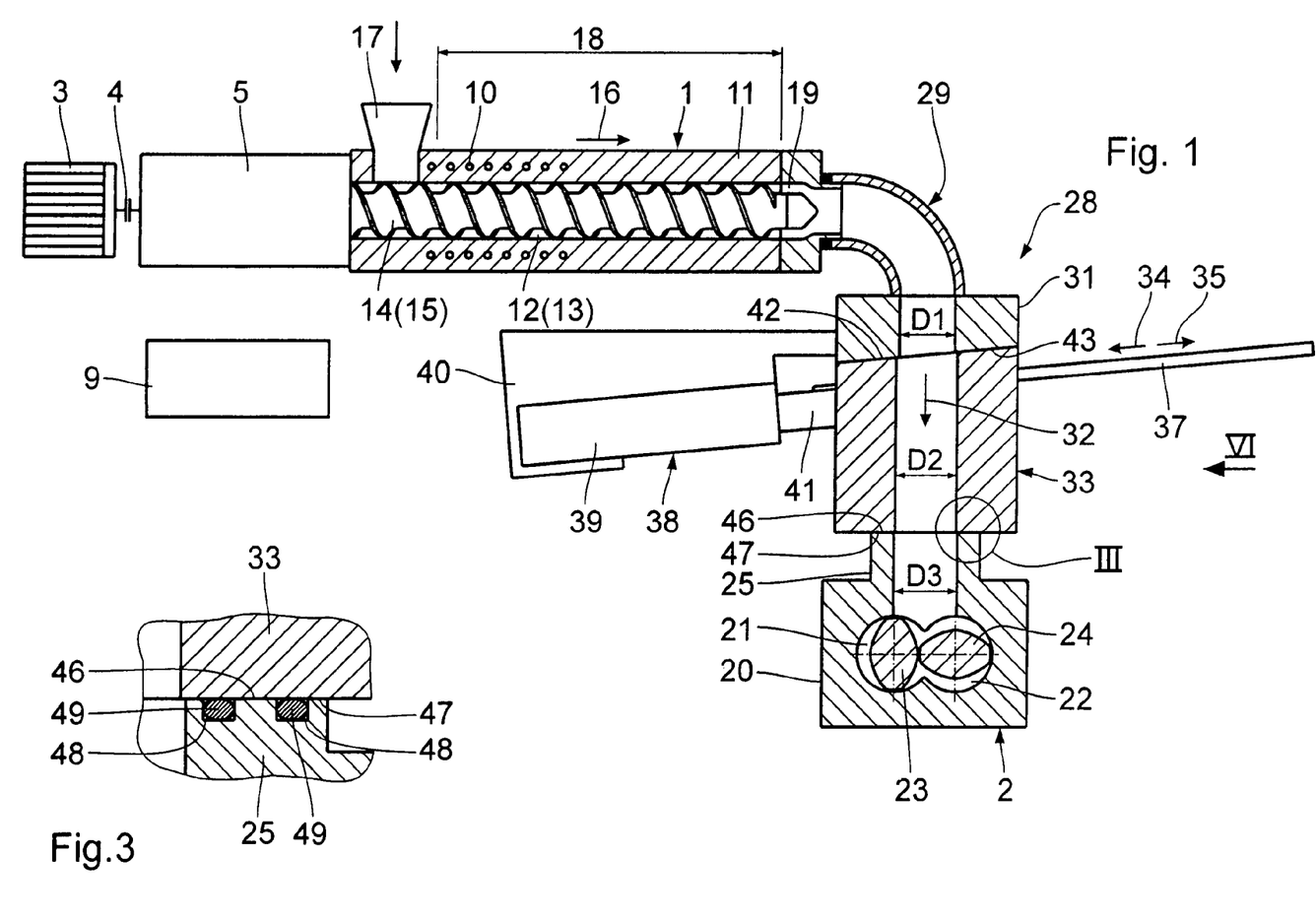
FIG. 1 is a vertical sectional view of a first embodiment of a plant according to the invention with a link in a position of connection.
FIG. 3 is an illustration of a detail II of FIG. 1.

The first extruder 1 comprises a casing 11 which is provided with a heating system 10 and has two first casing bores 12, 13 which are disposed in parallel to each other in approximately figure-eight-type interengagement. Two first screw shafts 14, 15 are disposed in these casing bores 12, 13; they are coupled with the first transmission 5. The screw shafts 14, 15 are driven in the same or opposite directions. The first extruder 1 comprises a feed hopper 17 which is disposed downstream of the first transmission 5 as seen in a feed direction 16 and which is followed by a single or several processing zones 18.

A discharge zone 19 is provided at the end of the first extruder 1. Instead of two casing bores and, correspondingly, two screw shafts, it is just as well possible to have only a single bore or three and more bores and a corresponding number of screw shafts.

The second extruder 2 also comprises a casing 20 with a heating system, two casing bores 21, 22 being disposed in the casing 20, having axes 21a, 22a that are parallel to each other, and interengaging i.e., also defining a figure-eight-type cross-sectional shape. Two screw shafts 23, 24 are disposed in the second casing bores 21, 22; they are coupled with the second transmission 8 and drivable to rotate in the same or opposite directions. Subsequently to the second transmission 8, the second extruder 2 comprises a feeder connection piece 25 which is followed by one or several processing zones 26 in the feed direction 16. A discharge zone 27 is again provided at the end of the second extruder 2.

It is true also for the second extruder 2 that only a single or more than two bores and a corresponding number of screw shafts can be provided. Also in the second extruder 2, the screw shafts can be driven in the same or opposite directions.

A delivery zone 28 is provided between the first extruder 1 and the second extruder 2; it comprises a pipe elbow 29, for example a heatable double-shell pipe, which is connected to the first extruder 1 and adjoins the discharge zone 19 thereof. Instead of the pipe elbow 29, a starting valve can be provided for ejection of materials which occasion upon start-up and cannot be used. A flange 31 of block design is formed on the end of the pipe elbow 29 that is turned towards the second extruder 2. Between the block-type flange 31 and the feeder connection piece 25 of the second extruder 2, provision is made for a function casing 33 which is displaceable crosswise of the direction of flow 32, having the shape of a wedge and tapering in the push-in direction 34 i.e., expanding in the push-out direction 35.

Figures 2, 4:
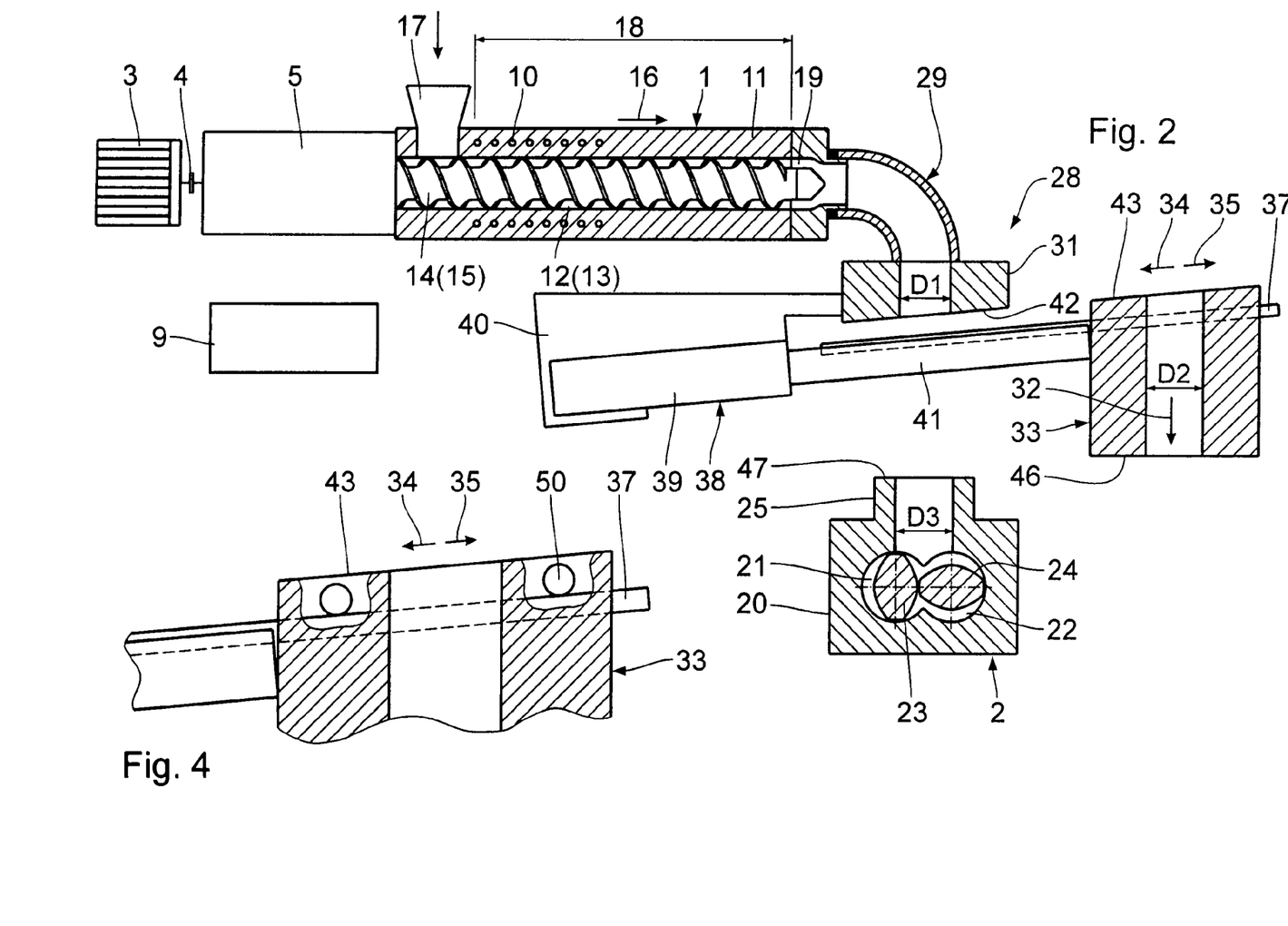
FIG. 2 is a plan view, partially broken open, of the plant according to the first embodiment.
FIG. 4 is an illustration of a detail of the function casing.
Figure 5:
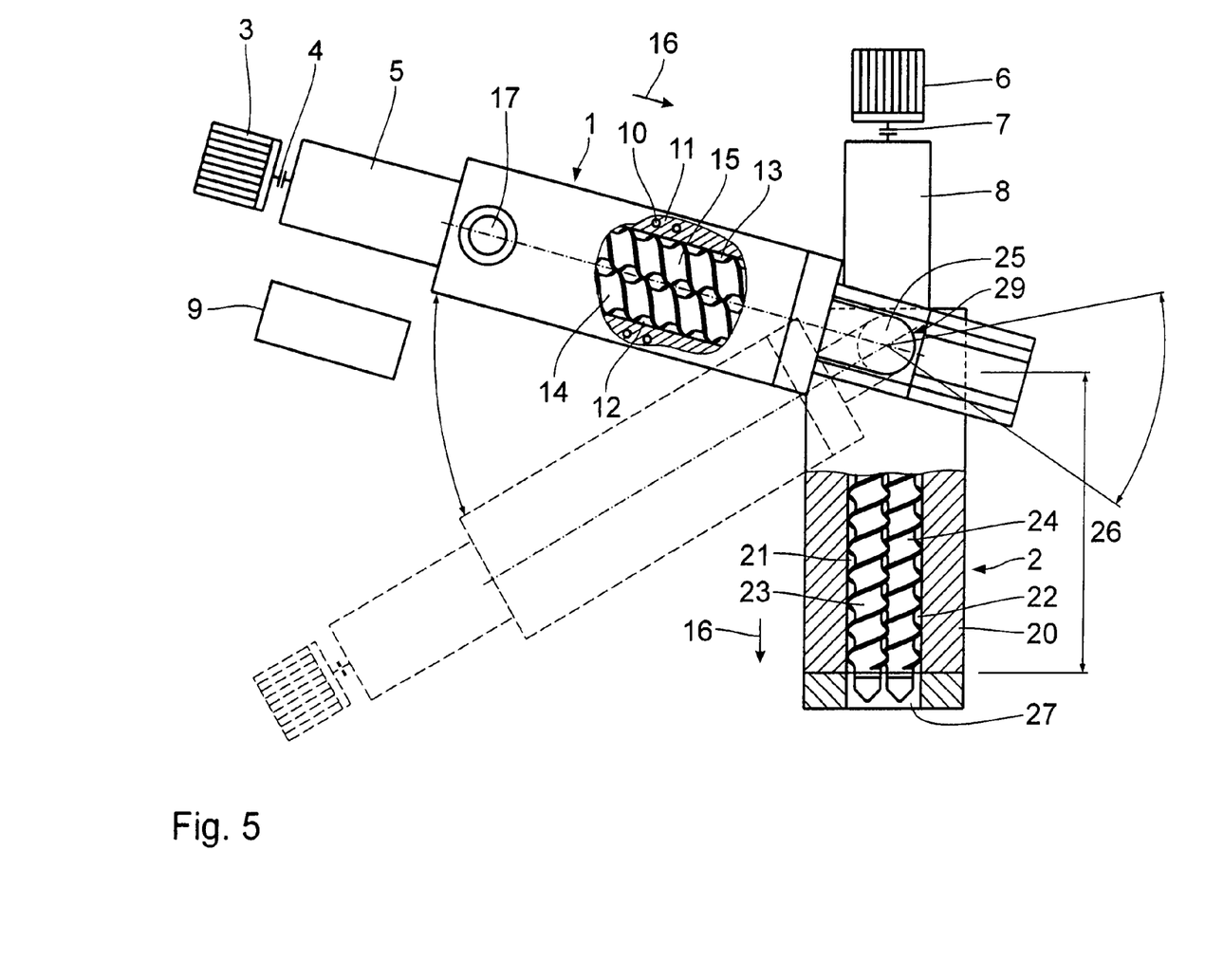
FIG. 5 is a view of the plant according to the first embodiment with the link in an open position.

By means of a rim 36 that is turned towards the flange 31 and projects laterally in the way of a flange, this function casing 33 is guided on rails 37 which run in the push-in direction 34 and push-out direction 35 and are fixed to the block-type flange 31 of the pipe elbow 29. These rails 37 can project—in the push-out direction 35—so far beyond the flange 31 that the function casing 33 can be pushed away completely from the flange 31 and the feeder connection piece 25, as seen in FIG. 2. As a rule, the function casing 33 is pushed out away from the first extruder 1 so that it is free therefrom.

Figure 6:
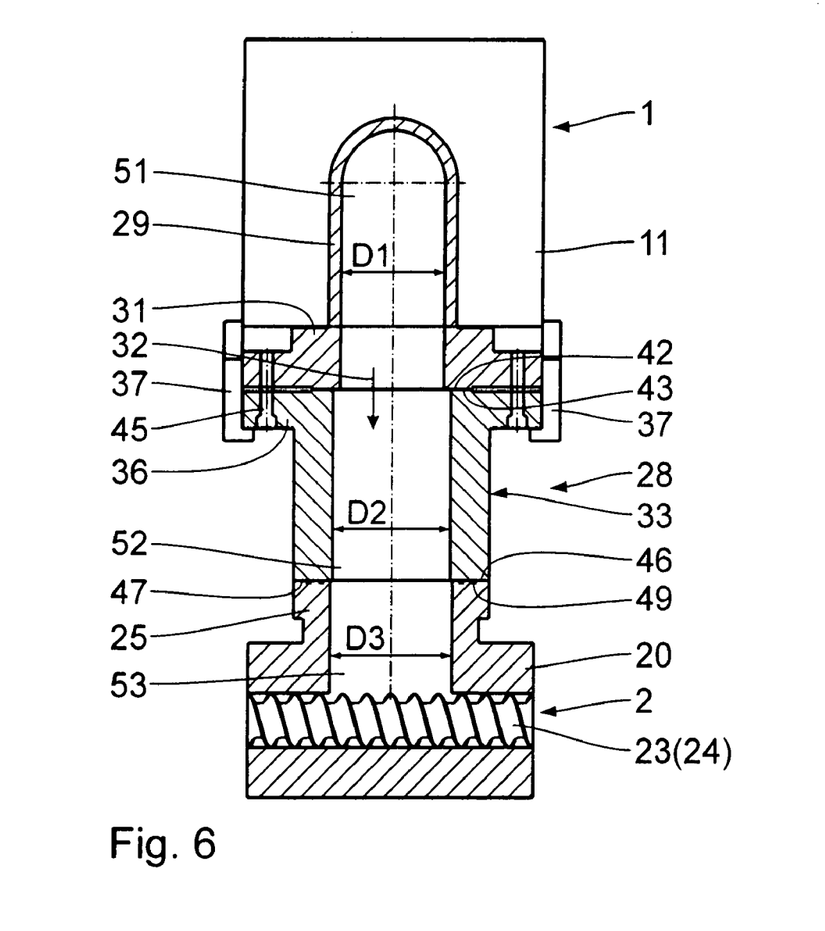
FIG. 6 is a view, broken open, in accordance with the arrow VI of FIG. 1.
Figure 7:
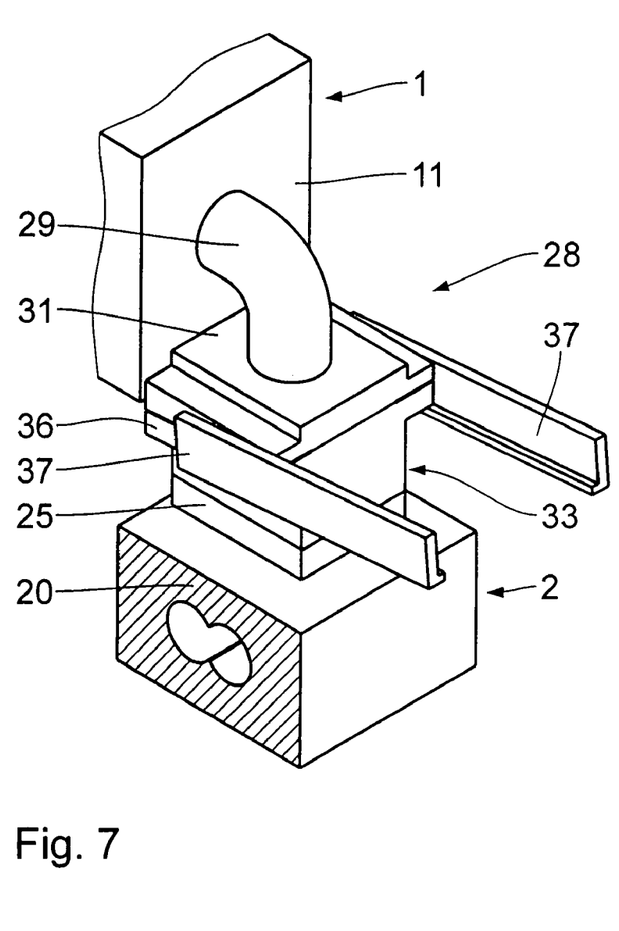
FIG. 7 is a perspective view of the delivery zone.
Figure 8:
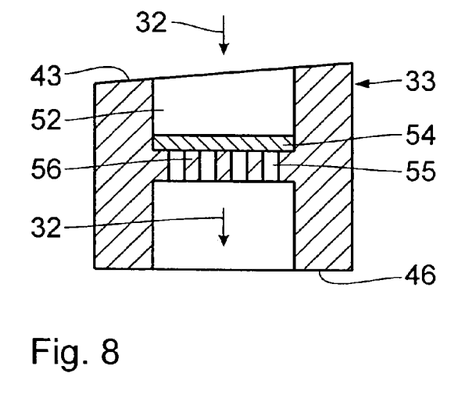
FIGS. 8 to 13 are illustrations of various things built in the function casing.
Figure 9:
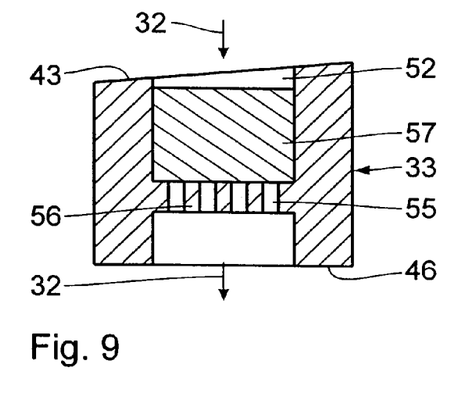
Figure 10:
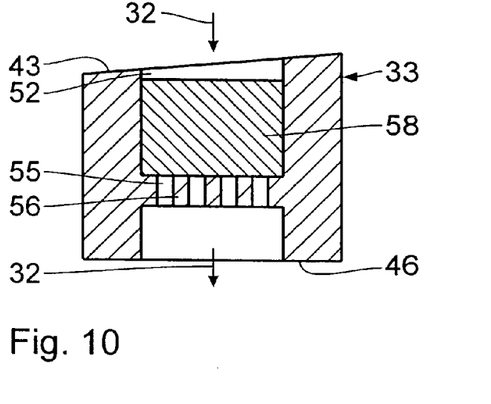
Figure 11:
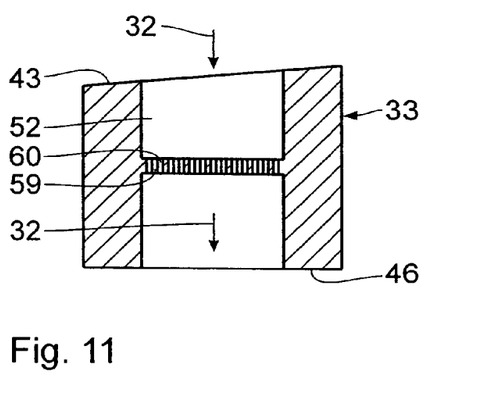
Figure 12:
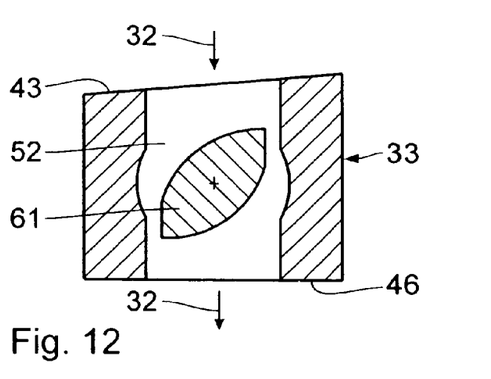

On the side of the function casing 33 that is turned away from the projecting area of the rails 37, provision is made for a slide drive 38 which is a linear drive, preferably a hydraulically operable piston-cylinder drive, the cylinder 39 of which is joined to the flange 31 by means of a carrying device 40, whereas its piston rod 41 acts on the function casing 33. The direction of action of this slide drive 38 is parallel to the rails 37, namely in the push-in direction 34 and the push-out direction 35. The contact surface 42 of the flange 31 and the contact surface 43 of the rim 36 also run in the directions 34, 35. When pushed in, the function casing 33 is connected to the flange 31 of the pipe elbow 29 by means of screws 45, as seen in FIG. 6.

In the first embodiment, the contact surfaces 46, 47, which are allocated to each other and formed on the function casing 33 and the feeder connection piece 25, extend crosswise of the direction of flow 32. The contact surface 47 of the feeder connection piece 25 is provided with encircling recesses 48 where packings 49 are provided which, when not loaded, stand out from the contact surface 47.

For the function casing 33 to be pushed out of its position of operation seen in FIG. 1 into the idle position seen in FIG. 2, the screws 45 are loosened and the slide drive 38 is operated. With the rails 37 inclining upwards as compared to the direction of the contact surfaces 46, 47, the function casing 33 is lifted off the contact surface 47 right at the beginning of the push-out motion. Loosening the screw 45 produces a slight play between the contact surfaces 42, 43 so that pushing out the function casing 33 along the contact surfaces 43 and 46 takes place with poor friction right from the first moment. What must be overcome are the shearing forces for separating the plug of material in the overflow passages 51, 52, 53 on the one hand and the frictional forces between the flange-type rim 36 and the rails 37 on the other. Push-in takes place in the opposite direction. During the last push-in phase, the packings 49 are pressed down by the contact surface 46 of the function casing 33 until the rim 36 lifts off the rails 37. In the further course, the contact surfaces 42 and 43 bear against one another. Then the rim 36 can be fixed to the flange 31 of the pipe elbow 29 by means of screws 45. For displacement of the function casing 33 to be facilitated, rolls 50 can be mounted thereon according to FIG. 4, which rest on the rails 37.

So as to make sure that the overflow passages 51, 52, 53, which are formed in the pipe elbow 29, the function casing 33 and the feeder connection piece 25, do not possess any corners or edges that project into the flow at the respective locations of transition, the following applies to the diameter $D_1$ of the overflow passage 51 of the elbow 29 as related to the diameter $D_2$ of the overflow passage 52 of the function casing 33, and to the latter as compared to the diameter $D_3$ of the overflow passage 53 of the feeder connection piece 25: $D_1 \leqq D_2 \leqq D_3$. As the overflow passages 51, 52, 53 have a circular cross-sectional shape and as the function casing 33 only rests on the connection piece 25, the first extruder 1 needs not be disposed crosswise of the second extruder 2, but can be disposed at an angle thereto, which is roughly outlined in FIG. 5.

FIGS. 8 to 13 illustrate various function elements which may be available in the function casing 33. According to FIG. 8, a sieve 54 is replaceably disposed in the overflow passage 52; it is supported on a supporting plate 56 which is provided with comparatively big bores 55. According to FIG. 9, a static mixer 57 is removably disposed on the supporting plate 56. According to FIG. 10, a filter 58 of sintered metal or metal foam or a frit is removably disposed on the supporting plate 56. In the embodiment according to FIG. 11, a strainer plate 59 is incorporated in the function casing 33, having distinctly smaller bores 60 than the supporting plate 56. The number of the small bores 60 in the strainer plate 59 clearly exceeds the number of the big bores 55 in the supporting plate 56.

Figure 13:
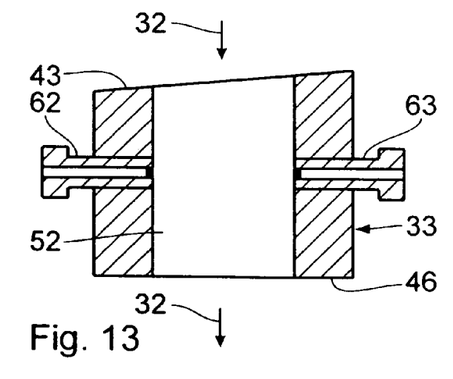

According to FIG. 13, a throttle 61 in the form of a wing throttle is incorporated in the function casing 33. According to FIG. 13, connections 62, 63 are incorporated in the function casing 33, leading into the overflow passage 52; transmitters are incorporated in the connections 62, 63, serving for online monitoring of the material that passes through or for taking samples or for adding materials. The incorporated parts described can of course also be disposed in combination with the function casing 33.

Figures 14, 15:
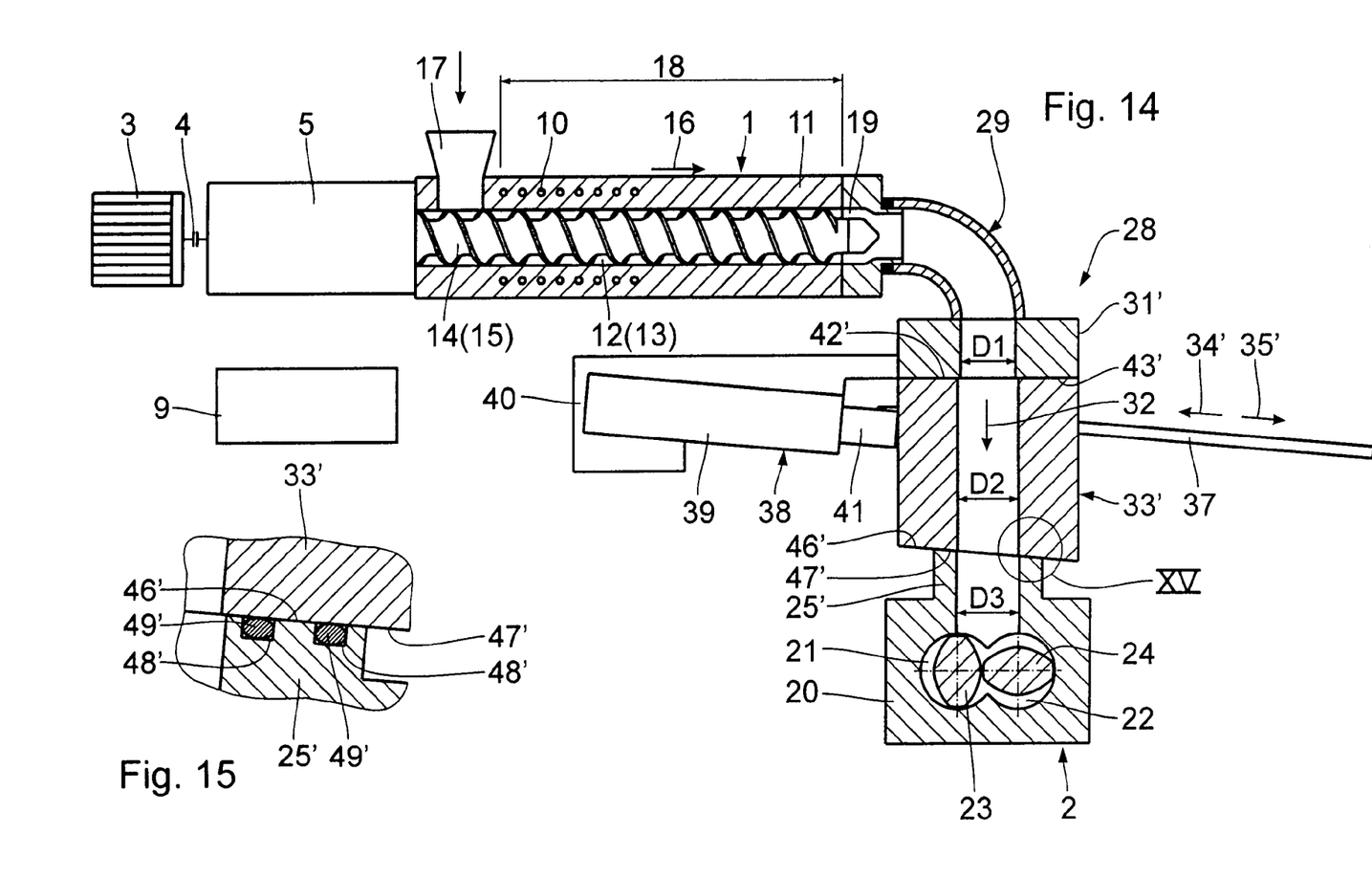
FIG. 14 is a view, according to FIG. 1, of a second embodiment of the invention.
FIG. 15 is an illustration of an detail XV of FIG. 14.

The second embodiment seen in FIGS. 14 and 15 differs from the afore-described first embodiment only in that the contact surfaces 42', 43' that are allocated to one another are disposed between the function casing 33' and the flange 31' crosswise of the direction of flow 32, and in that, correspondingly, the contact surfaces 46', 47' that are allocated to each other extend between the function casing 33' and the feeder connection piece 25', inclining in the push-out direction 35' and the push-in direction 34'. The slide drive 38 is inclined correspondingly.

Figures 16, 17:
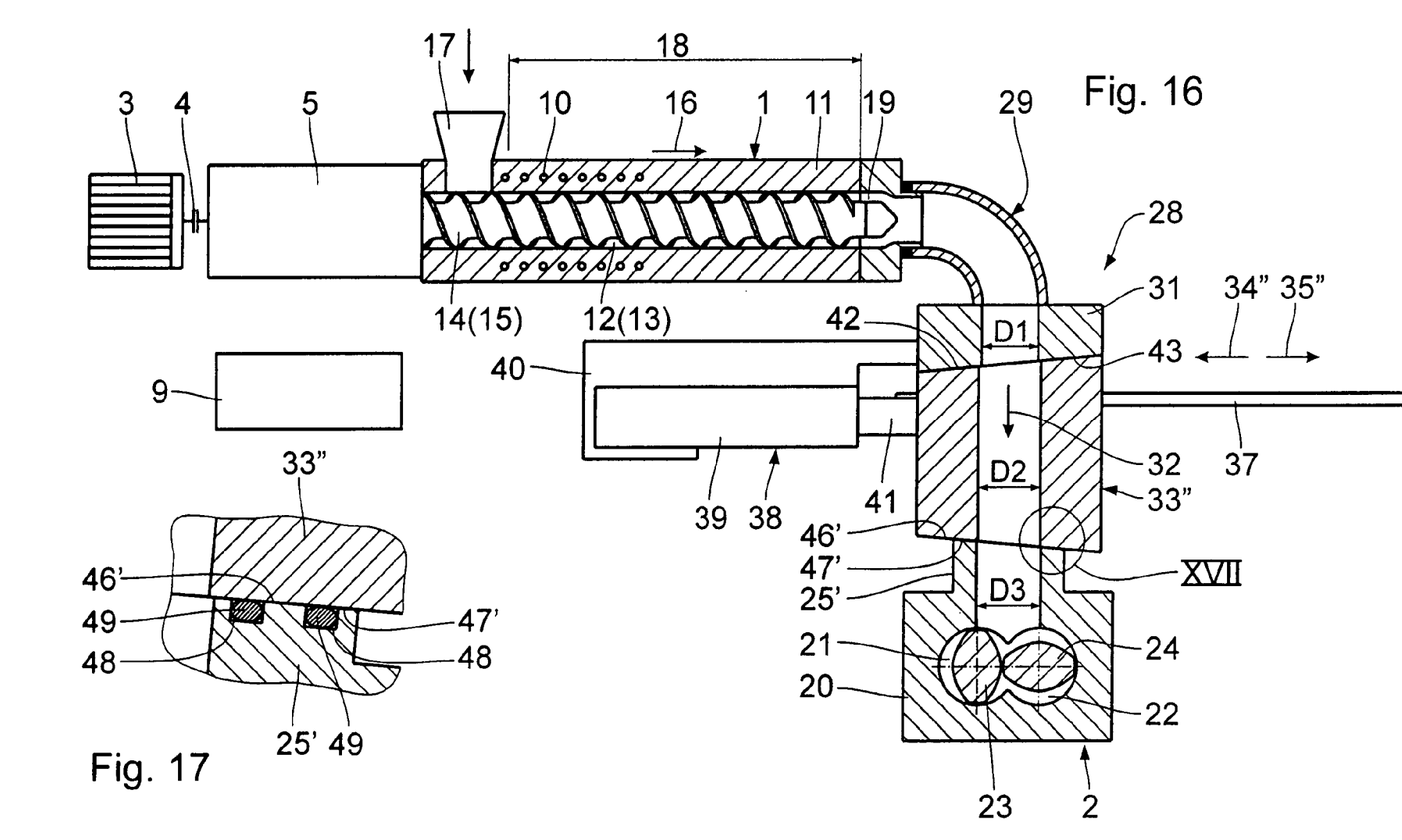
FIG. 16 is a view, according to FIG. 1, of a third embodiment of the invention.
FIG. 17 is an illustration of a detail XVII of FIG. 16.

The third embodiment according to FIGS. 16 and 17 differs from the embodiments described above only in that the contact surfaces 42, 43 between the function casing 33" and flange 31 as well as the contact surfaces 46', 47' between the function casing 33" and feeder connection piece 25' are inclined as related to the direction of flow 32. In this case, the push-in direction 34" and, correspondingly, the push-out direction 35" extend crosswise of the direction of flow 32.

Figures 18, 20:
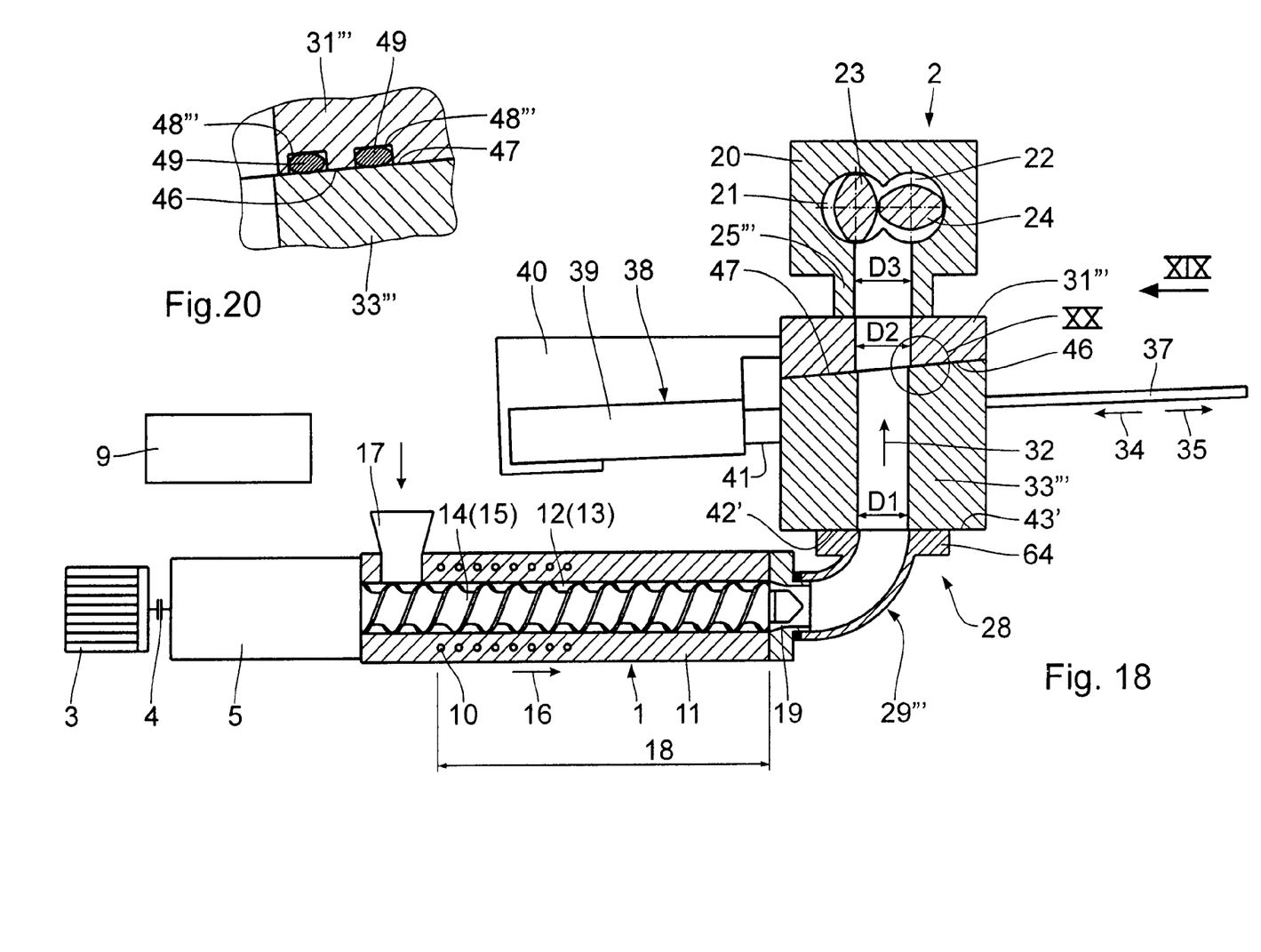
FIG. 18 is a vertical sectional view of a fourth embodiment according to the invention.
FIG. 20 is an illustration of a detail XX of FIG. 18.
Figure 19:
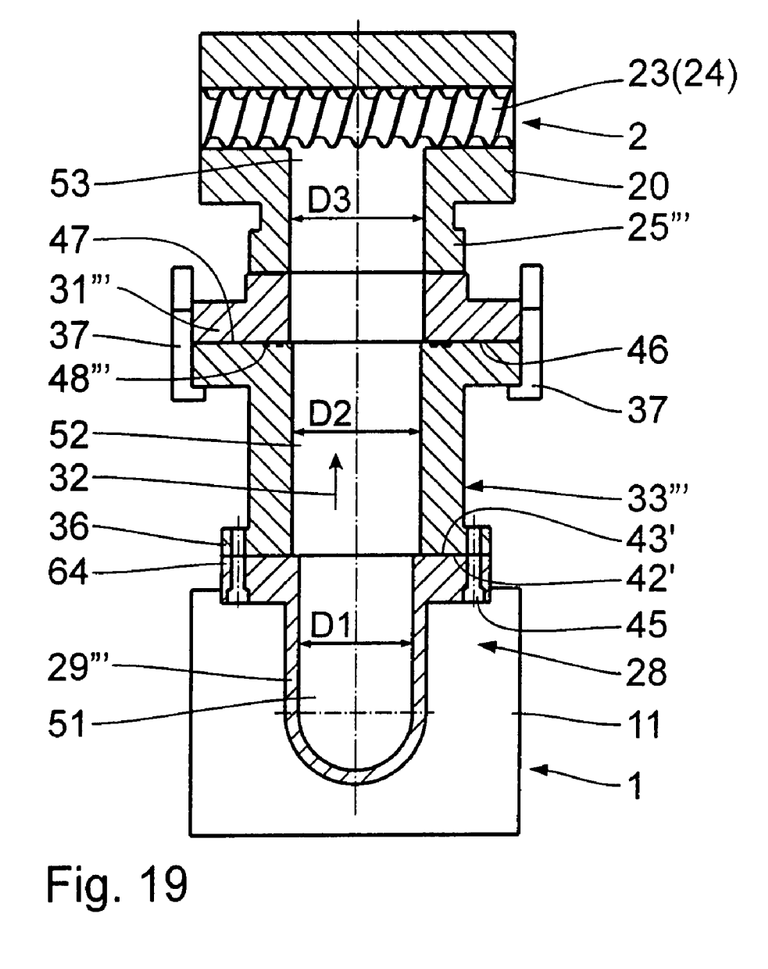
FIG. 19 is an illustration, broken open, in accordance with the arrow XIX of FIG. 18.

In the fourth embodiment according to FIGS. 18 to 20, the first extruder 1 is disposed below the second extruder 2, the feeder connection piece 25''' of which being directed downwards. Correspondingly, the block-type flange 31''' is mounted on the feeder connection piece 25'''. The pipe elbow 29''' is provided with a connecting flange 64 by way of which, in the operating position of the function casing 33''', the pipe elbow 29''' and the function casing 33''' are joined to one another by screws 45 so that the contact surfaces 42' and 43' bear tightly against, and seal towards, one another. In this embodiment, the rails 37 and, correspondingly, the slide drive 38 are mounted on the flange 31'''. The packings 49 are located in recesses 48''' in the contact surface 47 of the flange 31'''. Differing from the angular position of the slide drive 38 and the rails 37 of the first embodiment, the angle of the slide drive 38 must be located between the horizontal line and the angular position of the contact surfaces 46 and 47 in the fourth embodiment so that all the contact surfaces 46 and 47 and 42' and 43', respectively, are lifted off each other immediately upon push-out of the functions casing 33'''.

Otherwise, the description of the first embodiment respectively applies to the second to fourth embodiment.

While specific embodiments of the invention have been shown and described in detail to illustrate the application of the principles of the invention, it will be understood that the invention may be embodied otherwise without departing from such principles.

The invention claimed is:

1. A material processing plant, comprising:
a first extruder;
a second extruder downstream of the first extruder, one of the first and second extruder being disposed above one of the second and first extruder; and
a delivery zone which connects the first extruder to the second extruder;
wherein a function casing is disposed in the delivery zone, having a second overflow passage of a diameter $D_2$ which runs in a direction of flow, said function casing having a function element disposed in said second overflow passage, said function element being one of a sieve and a supporting plate and a static mixer and a filter and a strainer plate, said function casing being displaceable on rails via a slide drive, said slide drive having a direction of action which is parallel to said rails, said function casing being displaceable via said slide drive substantially to the side of the direction of flow out of a position of operation in the delivery zone in a push-out direction, said push-out direction being parallel to said direction of action and said rails extending in said push-out direction, said function casing expanding in the shape of a wedge in the push-out direction; and
wherein the second overflow passage of the function casing is connected to the first extruder by means of a first overflow passage of a diameter $D_1$, and the second extruder by means of a third overflow passage of a diameter $D_3$, wherein $D_1 \leq D_2 \leq D_3$, said function casing comprising a first contact surface and a second contact surface, wherein at least one of the first contact surface and the second contact surface extend one towards the other in the shape of a wedge, said first contact surface contacting a first overflow passage contact surface in said position of operation, said second contact surface contacting a third overflow passage contact surface in said position of operation, wherein packings are disposed in one of said second contact surface and said third overflow passage contact surface, one of said third overflow passage contact surface and said second contact surface being lifted off said packings when said function casing is moved in said push-out direction, said second contact surface and said third overflow passage contact surface extending perpendicular to said direction of flow, said rails being inclined with respect to said second contact surface and said third overflow passage contact surface.

2. A material processing plant according to claim 1, wherein the slide drive is a hydraulically operable piston-cylinder drive.

3. A material processing plant according to claim 1, wherein rollers are mounted on said function casing, said rollers being in contact with said rails.

4. A material processing plant, comprising:
a first extruder;
a second extruder downstream of the first extruder, one of the first and second extruder being disposed above one of the second and first extruder; and
a delivery zone which connects the first extruder to the second extruder;
wherein a function casing is disposed in the delivery zone, having a second overflow passage of a diameter $D_2$ which runs in a direction of flow, said function casing having a function element disposed in said second overflow passage, said function element being one of a sieve and a supporting plate and a static mixer and a filter and a strainer plate, said function casing being displaceable on rails via a slide drive, said slide drive having a direction of action parallel to said rails, said function casing being displaceable by said slide drive substantially to the side of the direction of flow out of a position of operation in the delivery zone in a push-out direction, said push-out direction being parallel to said direction of action and said rails extending in said push-out direction, said function casing expanding in the shape of a wedge in the push-out direction; and wherein the second overflow passage of the function casing is connected to the first extruder by means of a first overflow passage of a diameter $D_1$, and the second extruder by means of a third overflow passage of a diameter $D_3$, wherein $D_1 \leq D_2 \leq D_3$, said function casing comprising a first contact surface and a second contact surface, wherein at least one of the first contact surface and the second contact surface extend one towards the other in the shape of a wedge, said first contact surface contacting a first overflow passage contact surface in said position of operation, said second contact surface contacting a third overflow passage contact surface in said position of operation, wherein packings are disposed in one of said second contact surface and said third overflow passage contact surface, one of said third overflow passage contact surface and said second contact surface being lifted off said packings when said function casing is moved in said push-out direction; and wherein only the first contact surface is connected to the first overflow passage contact surface via screws in the position of operation, said screws connecting the first contact surface and the first overflow passage contact surface such that loosening said screws produces a play between the first contact surface and the first overflow passage contact surface.

5. A material processing plant according to claim 4, wherein the slide drive is a hydraulically operable piston-cylinder drive.

6. A material processing plant according to claim 4, wherein rollers are mounted on said function casing, said rollers being in contact with said rails.

7. A material processing plant according to claim 4, wherein said second contact surface and said third overflow passage contact surface extend perpendicular to said direction of flow, said rails being inclined with respect to said second contact surface and said third overflow passage contact surface.

8. A material processing plant according to claim 4, wherein the first and second contact surfaces and the first and third overflow passage contact surfaces are inclined with respect to said direction of flow, said push-out direction extending perpendicular to said direction of flow.

9. A material processing plant according to claim 4, wherein the first contact surface and the first overflow contact surface extend perpendicular to said direction of flow, said rails being inclined to the first contact surface and the first overflow contact surface between a horizontal line and an angular position of said second contact surface and said third overflow passage contact surface.

10. A material processing plant, comprising:
a first extruder having a defined first overflow passage, said first overflow passage having a first diameter based on a first overflow passage cross-section;
a second extruder located downstream of said first extruder, said second extruder having a defined second overflow passage and a second overflow contact surface, said second overflow passage having a second diameter based on a second overflow passage cross-section;
a delivery zone defined between said first extruder and said second extruder, said first extruder being connected to said second extruder at said delivery zone;
a guideway;
a slide drive;
a function casing having a third overflow passage and a third overflow contact surface, said third overflow passage having a third diameter based on a third overflow passage cross-section, wherein said first diameter is less than or equal to said third diameter, said third diameter being less than or equal to said second diameter, said function casing being movable along said guideway via said slide drive in a defined push-out direction from an operating position to an idle position, said guideway extending parallel to said push-out direction, said function casing being located within said delivery zone in said operating position, said function casing being connected to said first extruder and to said second extruder in said operating position such that material flows in a material flow direction from said first overflow passage to said second overflow passage via said third overflow passage, said function casing being disconnected from said first extruder and said second extruder in said idle position, said second overflow contact surface and said third overflow contact surface extending perpendicular to said direction of flow, said guideway being in an inclined position with respect to said second contact surface and said third overflow passage contact surface;
a sealing element disposed in said third overflow contact surface.

11. A material processing plant according to claim 10, wherein the slide drive is a hydraulically operable piston-cylinder drive.

12. A material processing plant according to claim 10, wherein rollers are mounted on said function casing, said rollers being in contact with said guideway.

13. A material processing plant, comprising:
a first extruder;
a second extruder downstream of the first extruder, one of the first and second extruder being disposed above one of the second and first extruder; and
a delivery zone which connects the first extruder to the second extruder, wherein a function casing is disposed in the delivery zone, having a second overflow passage of a diameter $D_2$ which runs in a direction of flow, said function casing having a function element disposed in said second overflow passage, said function element being one of a sieve and a supporting plate and a static mixer and a filter and a strainer plate, said function casing being displaceable on rails via a slide drive, said slide drive having a direction of action which is parallel to said rails, said function casing being displaceable via said slide drive substantially to the side of the direction of flow out of a position of operation in the delivery zone in a push-out direction, said push-out direction being parallel to said direction of action and said rails extending in said push-out direction, said function casing expanding in the shape of a wedge in the push-out direction, wherein the second overflow passage of the function casing is connected to the first extruder by means of a first overflow passage of a diameter $D_1$, and the second extruder by means of a third overflow passage of a diameter $D_3$, wherein $D_1 \leqq D_2 \leqq D_3$, said function casing comprising a first contact surface and a second contact surface, wherein at least one of the first contact surface and the second contact surface extend one towards the other in the shape of a wedge, said first contact surface contacting a first overflow passage contact surface in said position of operation, said second contact surface contacting a third overflow passage contact surface in said position of operation, wherein packings are disposed in one of said second contact surface and said third overflow passage contact surface, one of said third overflow passage contact surface and said second contact surface being lifted off said packings when said function casing is moved in said push-out direction, the first contact surface and the first overflow contact surface extending perpendicular to said direction of flow, said rails being inclined to the first contact surface and the first overflow contact surface between a horizontal line and an angular position of said second contact surface and said third overflow passage contact surface.

* * * * *